United States Patent
Griffin et al.

(10) Patent No.: US 12,393,721 B2
(45) Date of Patent: Aug. 19, 2025

(54) SIDECAR DATA SERVICES FOR ENFORCING DATA POLICIES

(71) Applicant: Red Hat, Inc., Raleigh, NC (US)

(72) Inventors: Leigh Griffin, Waterford (IE); Julia Bley, Grasbrunn (DE)

(73) Assignee: Red Hat, Inc., Raleigh, NC (US)

( * ) Notice: Subject to any disclaimer, the term of this patent is extended or adjusted under 35 U.S.C. 154(b) by 243 days.

(21) Appl. No.: 17/976,211

(22) Filed: Oct. 28, 2022

(65) Prior Publication Data

US 2024/0143825 A1    May 2, 2024

(51) Int. Cl.
*G06F 21/62*      (2013.01)

(52) U.S. Cl.
CPC ................ *G06F 21/6227* (2013.01)

(58) Field of Classification Search
CPC .............. G06F 21/6227; G06F 16/00
See application file for complete search history.

(56) References Cited

U.S. PATENT DOCUMENTS

| | | | |
|---|---|---|---|
| 10,623,390 B1 * | 4/2020 | Rosenhouse | H04L 67/10 |
| 2019/0273746 A1 | 9/2019 | Coffing | |
| 2019/0391834 A1 * | 12/2019 | Mullen | G06F 9/5038 |
| 2022/0224535 A1 | 7/2022 | Coffing | |
| 2022/0300611 A1 * | 9/2022 | Sivaswamy | G06F 21/57 |
| 2023/0065431 A1 * | 3/2023 | Kumar | G06F 8/65 |
| 2023/0125847 A1 * | 4/2023 | Sato | G06F 9/50 718/1 |
| 2024/0037254 A1 * | 2/2024 | Yannuzzi | G06F 40/166 |
| 2024/0095066 A1 * | 3/2024 | Shin | G06F 11/2023 |
| 2024/0111579 A1 * | 4/2024 | Chernobrivenko | G06F 9/4881 |

FOREIGN PATENT DOCUMENTS

WO    WO-2021150366 A1 *   7/2021  ......... G06F 11/0757

OTHER PUBLICATIONS

Eknert, Anders, "4 Best Practices for Microservices Authorization," The New Stack, https://thenewstack.io/4-best-practices-for-microservices-authorization/, May 11, 2022, 8 pages.

* cited by examiner

*Primary Examiner* — Esther B. Henderson
(74) *Attorney, Agent, or Firm* — Dority & Manning, P.A.

(57) ABSTRACT

A query is received from an application. A data store is accessed and a set of data items are extracted from the data store based on the query. Access to the set of data items is provided to the sidecar process. Based on a criterion, the sidecar process causes the set of data items to be modified by at least one of adding additional information to the set of data items, deleting a data item from the set of data items, or altering a data item in the set of data items to generate a modified set of data items. The modified set of data items is provided to the application.

20 Claims, 9 Drawing Sheets

SIDECAR DATA SERVICES FOR ENFORCING DATA POLICIES

BACKGROUND

Data stored in a data store may have to be treated differently depending on characteristics of the entity requesting the data. From a privacy standpoint data privacy issues are increasingly the subject of legislation. Countries have legislated that certain types of data be treated differently from other types of data, and there is no uniform inter-country policy regarding data. Thus an entity seeking access in one country to a data store may be prohibited from viewing the data, and an entity seeking access in another country to the same data store may be permitted to have access to the data.

SUMMARY

The examples disclosed herein implement sidecar data services for enforcing data policies. The examples eliminate the need to modify a data store for different data policies, such as for different geographic regions, and eliminate the need to modify one or more data service applications that operate to receive requests for information from a data store, access the data store based on the request and respond with the data.

In one example a method is provided. The method includes determining, by a first data store access process executing on a computing system comprising one or more computing devices, that a first sidecar process exists. The method further includes receiving, by the first data store access process from a first application, a first query. The method further includes accessing, by the first data store access process, the first data store and extracting a first set of data items from the first data store based on the first query. The method further includes providing, to the first sidecar process by the first data store access process, access to the first set of data items. The method further includes causing, by the first sidecar process and based on a first criterion, the first set of data items to be modified by at least one of adding additional information to the first set of data items, deleting a data item from the first set of data items, or altering a data item in the first set of data items to generate a modified first set of data items. The method further includes providing, by the first data store access process, the modified first set of data items to the first application.

In another example a computing system is provided. The computing system includes one or more computing devices to determine that a first sidecar process exists. The one or more computing devices are further to receive, from an application, a query. The one or more computing devices are further to access the data store and extract a set of data items from the data store based on the query. The one or more computing devices are further to provide, to the sidecar process, access to the set of data items. The one or more computing devices are further to cause, by the sidecar process and based on a criterion, the set of data items to be modified by at least one of adding additional information to the set of data items, deleting a data item from the set of data items, or altering a data item in the set of data items to generate a modified set of data items. The one or more computing devices are further to provide the modified first set of data items to the first application.

In another example a non-transitory computer-readable storage medium is provided. The non-transitory computer-readable storage medium includes executable instructions to cause one or more processor devices to receive, from an application, a query. The executable instructions further cause one or more processor devices to access the data store and extract a set of data items from the data store based on the query. The executable instructions further cause one or more processor devices to provide, to a sidecar process, access to the set of data items. The executable instructions further cause one or more processor devices to cause, by the sidecar process and based on a criterion, the set of data items to be modified by at least one of adding additional information to the set of data items, deleting a data item from the set of data items, or altering a data item in the set of data items to generate a modified set of data items. The executable instructions further cause one or more processor devices to provide the modified first set of data items to the first application.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context.

Data stored in a data store, such as a database or other data structure, may have to be treated differently depending on characteristics of the entity requesting the data. From a privacy standpoint data privacy issues are increasingly the subject of legislation. Countries have legislated that certain types of data be treated differently from other types of data, and there is no uniform inter-country policy regarding data. Thus an entity seeking access in one country to a data store may be prohibited from viewing the data, and an entity seeking access in another country to the same data store may be permitted to have access to the data.

A large data store may be accessed from many different locations, including different geographic zones, such as different countries, or may be replicated (e.g., copied and synchronized) across such locations. Administering the data in a large data store to ensure that accesses of the data do not violate any policies, including laws, can be time-consuming and can result in unique individual data stores for each separate policy-based region to ensure that the data store does not contain data that is prohibited according to such policies. Alternatively, data access processes that receive queries from applications and access the data store can be programmed to comply with various policies to ensure that data that should not be presented is not presented. However, there may be many such policies and policies change over time, resulting, in time, with a bloated data access process that must be continuously updated, tested and debugged with each new policy change.

The examples disclosed herein implement sidecar data services for enforcing data policies. The examples eliminate the need to modify a data store for different data policies, such as for different geographic regions, and eliminate the need to modify one or more data service applications that operate to receive requests for information from a data store, access the data store based on the request and respond with the data. The examples implement a sidecar process that operates based on one or more criterion, such as predetermined policies, and that operate seamlessly in conjunction with a data service application to enforce such policies, without requiring the data access application to be aware of any particular policies.

Figure 1:
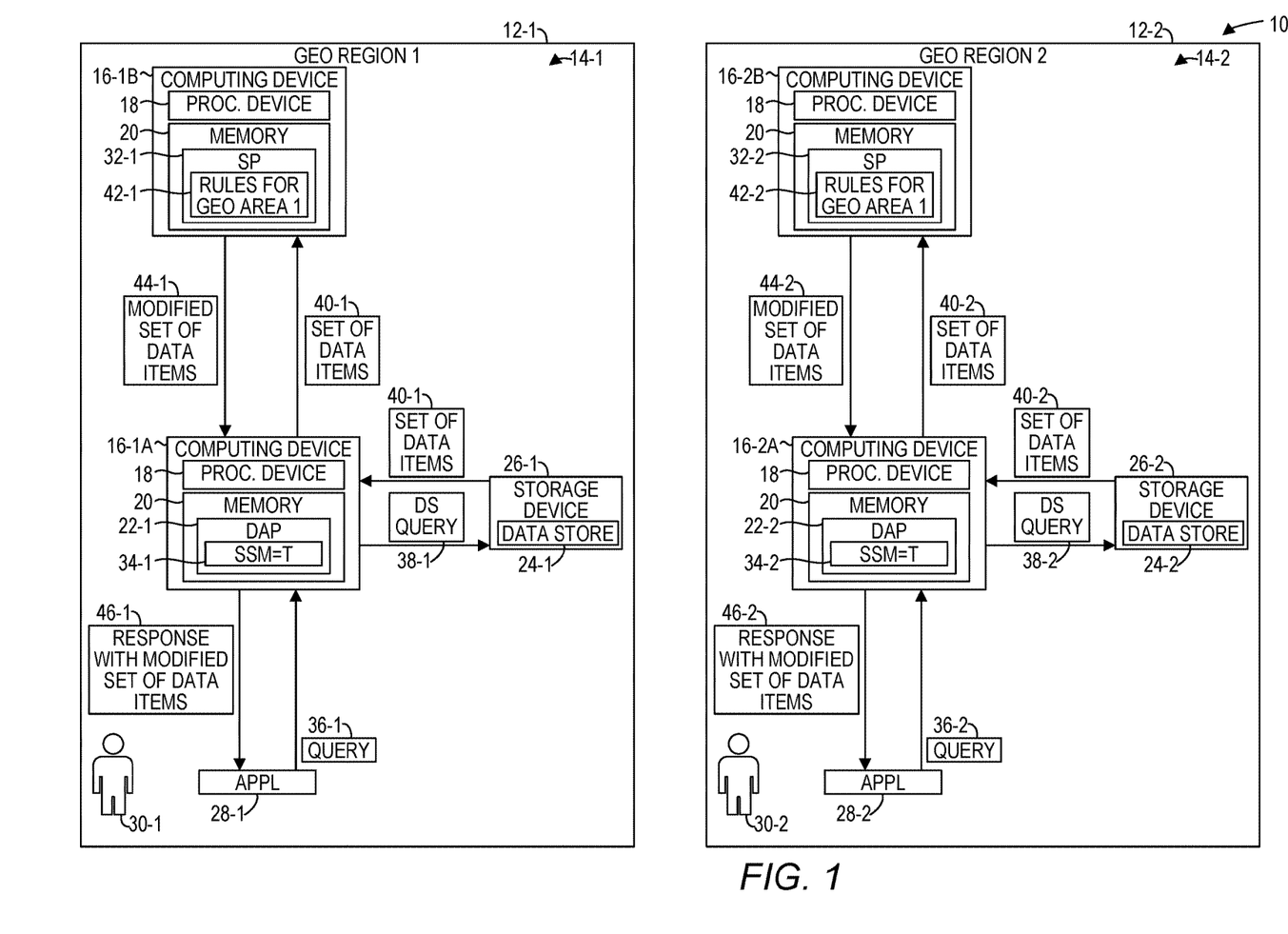
FIG. 1 is a block diagram of an environment in which sidecar data services for enforcing data policies can be practiced according to some examples.

FIG. 1 is a block diagram of an environment 10 in which sidecar data services for enforcing data policies can be practiced according to some examples. The environment 10 includes two geographic regions 12-1 and 12-2, such as different states in the United States, or different countries. The geographic regions 12-1 and 12-2 include substantially similar components, but have different data policies. The geographic region 12-1 includes a computing system 14-1 that includes computing devices 16-1A and 16-1B, each of which includes a processor device 18 and a memory 20. The computing device 16-1A includes a data store access process (DAP) 22-1 that is operable to access a data store 24-1 stored on a storage device 26-1 in the geographic region 12-1. The DAP 22-1 receives, from one or more applications 28-1, requests for information stored in the data store 24-1. The applications 28-1 can be any type of application that utilizes data from the data store 24-1, such as, by way of non-limiting example, an application with a user interface via which a user 30-1 can request data from the data store 24-1.

The DAP 22-1 determines whether a sidecar process 32-1 exists. If so, the DAP 22-1 enters into a sidecar supplementation mode and provides the sidecar process 32-1 with queries received from the application 28-1 and data items obtained from the data store 24-1. The sidecar process 32-1 includes a plurality of policies and rules, referred to herein as criteria, via which the sidecar process 32-1 enforces data policies on the data items obtained by the DAP 22-1 in response to a query from the application 28-1.

In some implementations, the examples may be implemented via a container orchestration system such as Kubernetes or OpenShift®, and the DAP 22-1 and the sidecar process 32-1 may comprise containers that run in the same pod and may run on the same computing device. The term "sidecar process" as used herein refers to a process that serves to add functionality to a primary process, in this case the DAP 22-1. The sidecar process 32-1 may add functionality to only the DAP 22-1, and if multiple DAPs are initiated, each may have its own sidecar process.

A DAP, such as the DAP 22-1, may be initiated from the same executable irrespective of geographic area because the data policies that are unique to each geographic region are enforced by the sidecar process 32-1, such that the DAP 22-1 need not be modified or otherwise updated if the data policies change and need not be specially programmed for each different region having different data policies. The sidecar process 32-1 may be different for each geographic area, or may be the same but operate differently solely based on the criterion provided to the sidecar process 32-1.

To illustrate sidecar data services for enforcing data policies according to one example, assume that the DAP 22-1 and the sidecar process 32-1 are initiated on the computing devices 16-1A and 16-1B, respectively. The DAP 22-1 may, as part of the initialization process, determine whether the sidecar process 32-1 exists. The DAP 22-1 may make this determination in any manner in which one process can determine the existence of another process. In one example, the orchestration mechanism that initiated the DAP 22-1 may provide the DAP 22-1 information that indicates the existence of the sidecar process 32-1, such as via environment variables or the like. In one example, the DAP 22-1 may invoke a predetermined API endpoint of the sidecar process 32-1. If the sidecar process 32-1 exists, the sidecar process 32-1 provides a response to the invocation indicating the existence of the sidecar process 32-1. If the sidecar process 32-1 does not exist, then the DAP 22-1 receives no response, or a failure message, either of which indicates that the sidecar process 32-1 does not exist.

In this example, the DAP 22-1 determines that the sidecar process 32-1 exists, and sets a sidecar supplementation mode flag 34-1 to enter a sidecar supplementation mode. The user 30-1 subsequently manipulates a user interface offered by the application 28-1 to request certain data from the data store 24-1. The application 28-1 submits a query 36-1 to the DAP 22-1. The query 36-1 may comprise, for example, a request for information about the employees who are managed by the user 30-1, such as their names, salaries, and residential addresses. The data store 18-1 in this example is an employee database that contains information regarding all the employees of the company that employs the user 30-1.

The DAP 22-1 receives the query 36-1, determines that the DAP 22-1 is in the sidecar supplementation mode based on the sidecar supplementation mode flag 34-1, and provides the query 36-1 to the sidecar process 32-1. The DAP 22-1 may provide the query 36-1 to the sidecar process 32-1 via any suitable inter-process communication mechanism. In this example, the sidecar process 32-1 does not modify the query 36-1. The DAP 22-1 accesses the data store 24-1 to obtain the requested information from the data store 24-1. Specifically, the DAP 22-1 may send a data store query 38-1 that utilizes specific data store access commands, such as SQL commands or the like, that the data store 24-1 requires in order to obtain information from the data store 24-1.

The data store 24-1 responds to the data store query 38-1 with a set of data items 40-1. The set of data items 40-1 may include, for example, the names of the employees, the salaries of the employees, and the residential addresses of the employees. The set of data items 40-1 may also include data item metadata that identifies what the data items are, such as names, salaries and residential address information. The DAP 22-1 determines that the DAP 22-1 is in the sidecar supplementation mode and provides the sidecar process 32-1 access to the set of data items 40-1. If the DAP 22-1 were not in the sidecar supplementation mode, the DAP 22-1 does not interact with the sidecar process 32-1. The non-sidecar supplementation mode may be used, for example, for a geographic region that has no data policies, or for a data store that does not contain data that may be subject to any data policies.

The DAP 22-1 may send the set of data items 40-1 to the sidecar process 32-1. Alternatively, the DAP 22-1 may provide the sidecar process 32-1 with location information indicating a location of the first set of data items 40-1. The DAP 22-1 may also provide the sidecar process 32-1 access to metadata associated with the query 36-1, such as an identifier of the user 30-1, privileges associated with the user 30-1, and the like.

The sidecar process 32-1 accesses rules 42-1 which comprise a criterion or criteria identifying data policies that are to be enforced in the geographic region 12-1. The criterion indicate that residential information is prohibited from being provided unless the requestor has a certain privilege level, and thus, that a subset of the set of data items 40-1 may be prohibited from being provided. The sidecar process 32-1 may analyze metadata associated with the query 36-1 and determine that the user 30-1 does not have a sufficient authorization level to request residential information. The sidecar process 32-1 may then modify the set of data items 40-1 to generate a modified set of data items 44-1. The sidecar process 32-1 may modify the 40-1 by, for example, deleting the residential address data items from the set of data items 40-1, or by altering the residential address data items in the set of data items 40-1, such as by replacing the residential information with other information, such as a predetermined symbol, or message indicating that the information cannot be provided. The DAP 22-1 may then generate a response 46-1 that includes the modified set of data items 44-1, and send the response 46-1 to the application 28-1 for presentation to the user 30-1.

It is noted that, in some examples, the sidecar process 32-1 may provide input prior to the DAP 22-1 accessing the data store 24-1. For example, the sidecar process 32-1 may determine that the residential address information is prohibited, and instruct the DAP 22-1 to not request the residential address information from the data store 24-1. The DAP 22-1 may then either immediately respond to the application 28-1 indicating that the query 36-1 cannot be completed, or may access the data store 24-1 and retrieve only the employee names and salaries.

The geographic region 12-2 includes a computing system 14-2 that includes computing devices 16-2A and 16-2B, each of which includes the processor device 18 and the memory 20. The computing device 16-2A includes a DAP 22-2 that is operable to access a data store 24-2 stored on a storage device 26-2 in the geographic region 12-2. The DAP 22-2 may be executing concurrently in time with the DAP 22-1. The data store 24-2 may be an exact copy of the data store 24-1, or may be derived from a common copy and contain substantially identical information, but be continuously synchronized with the data store 24-1 such that any differences exist for only the times between synchronizations. The DAP 22-2 receives, from one or more applications 28-2, requests for information stored in the data store 24-2. The applications 28-2 can be any type of application that utilizes data from the data store 24-2, such as, by way of non-limiting example, an application with a user interface via which a user 30-2 can request data from the data store 24-2.

The DAP 22-2 determines whether a sidecar process 32-2 exists in the same manner discussed above with regard to the DAP 22-1 and the sidecar process 32-1. If so, the DAP 22-2 enters into the sidecar supplementation mode and provides the sidecar process 32-2 with queries received from the application 28-2 and data items obtained from the data store 24-2. The sidecar process 32-2 includes a plurality of policies and rules, referred to herein as criteria, via which the sidecar process 32-2 enforces data policies on the data items provided by the DAP 22-2 to the application 28-2.

Again, in some implementations, the examples may be implemented via a container orchestration system such as Kubernetes or OpenShift®, and the DAP 22-2 and the sidecar process 32-2 may comprise containers that run in the same pod and may run on the same computing device.

The DAP 22-2 may be initiated from the same executable as the DAP 22-1. The sidecar process 32—may also be initiated from the same executable as the DAP 22-2, or may be programmed differently for the geographic region 12-2.

To further illustrate sidecar data services for enforcing data policies according to the example discussed above with regard to the geographic region 12-1, assume that the DAP 22-2 and the sidecar process 32-2 are initiated on the computing devices 16-2A and 16-2B, respectively. The DAP 22-2 may, as part of the initialization process, determine whether the sidecar process 32-2 exists in the same manner discussed above. In this example, the DAP 22-2 determines that the sidecar process 32-2 exists, and sets a sidecar supplementation mode flag 34-2 to enter the sidecar supplementation mode. The user 30-2 subsequently manipulates a user interface offered by the application 28-2 to request certain data from the data store 24-2. The application 28-2 submits a query 36-2 to the DAP 22-2. The query 36-2 may comprise, for example, a request for information about the employees who are managed by the user 30-2, such as their names, salaries, and residential addresses.

The DAP 22-2 receives the query 36-2, and determines that the DAP 22-2 is in the sidecar supplementation mode based on the sidecar supplementation mode flag 34-2, and provides the query 36-2 to the sidecar process 32-2. In this example, the sidecar process 32-2 does not modify the query 36-2. The DAP 22-2 accesses the data store 24-2 to obtain the requested information from the data store 24-2. Specifically, the DAP 22-2 may send a data store query 38-2 that utilizes specific data store access commands, such as SQL commands or the like, that the data store 24-2 requires in order to obtain information from the data store 24-2.

The data store 24-2 responds to the data store query 38-2 with a set of data items 40-2. The set of data items 40-2 may include, for example, the names of the employees, the salaries of the employees, and the residential addresses of the employees. The set of data items 40-2 may also include data item metadata that identifies what the data items are, such as names, salaries and residential address information. The DAP 22-2 provides the sidecar process 32-2 access to the set of data items 40-2. For example, the DAP 22-2 may send the set of data items 40-2 to the sidecar process 32-2. Alternatively, the DAP 22-2 may provide the sidecar process 32-2 with location information indicating a location of the first set of data items. The DAP 22-2 may also provide the sidecar process 32-2 access to metadata associated with the query 36-2, such as an identifier of the user 30-2, privileges associated with the user 30-2, and the like.

The sidecar process 32-2 accesses rules 42-2 which comprise a criterion or criteria identifying data policies that are to be enforced in the geographic region 12-2. The criterion indicate that street residential information is prohibited from being provided unless the requestor has a certain privilege level, but that city and state information is not prohibited. The sidecar process 32-2 may analyze metadata associated with the query 36-2 and determine that the user 30-2 does not have a sufficient authorization level to request street residential information. The sidecar process 32-2 may then modify the set of data items 40-2 to generate a modified set of data items 44-2. The sidecar process 32-2 may modify the 40-2 by, for example, deleting the street residential address data items from the set of data items 40-2 while keeping the city and state data items, or by altering the street residential address data items in the set of data items 40-2, such as by replacing the street residential information with other information, such as a predetermined symbol, or message indicating that the information cannot be provided. The DAP 22-2 may then generate a response 46-2 that includes the modified set of data items 44-2, and send the response 46-2 to the application 28-2 for presentation to the user 30-2.

Because the DAP 22-1 and the sidecar process 32-1 are components of the computing devices 16-1A and 16-1B, respectively, functionality implemented by the DAP 22-1 and the sidecar process 32-1 may be attributed to the computing devices 16-1A and 16-1B generally. Moreover, in examples where the DAP 22-1 and the sidecar process 32-1 comprise software instructions that program the processor devices 18 to carry out functionality discussed herein, functionality implemented by the DAP 22-1 and the sidecar process 32-1 may be attributed herein to the processor devices 14.

Figure 2:
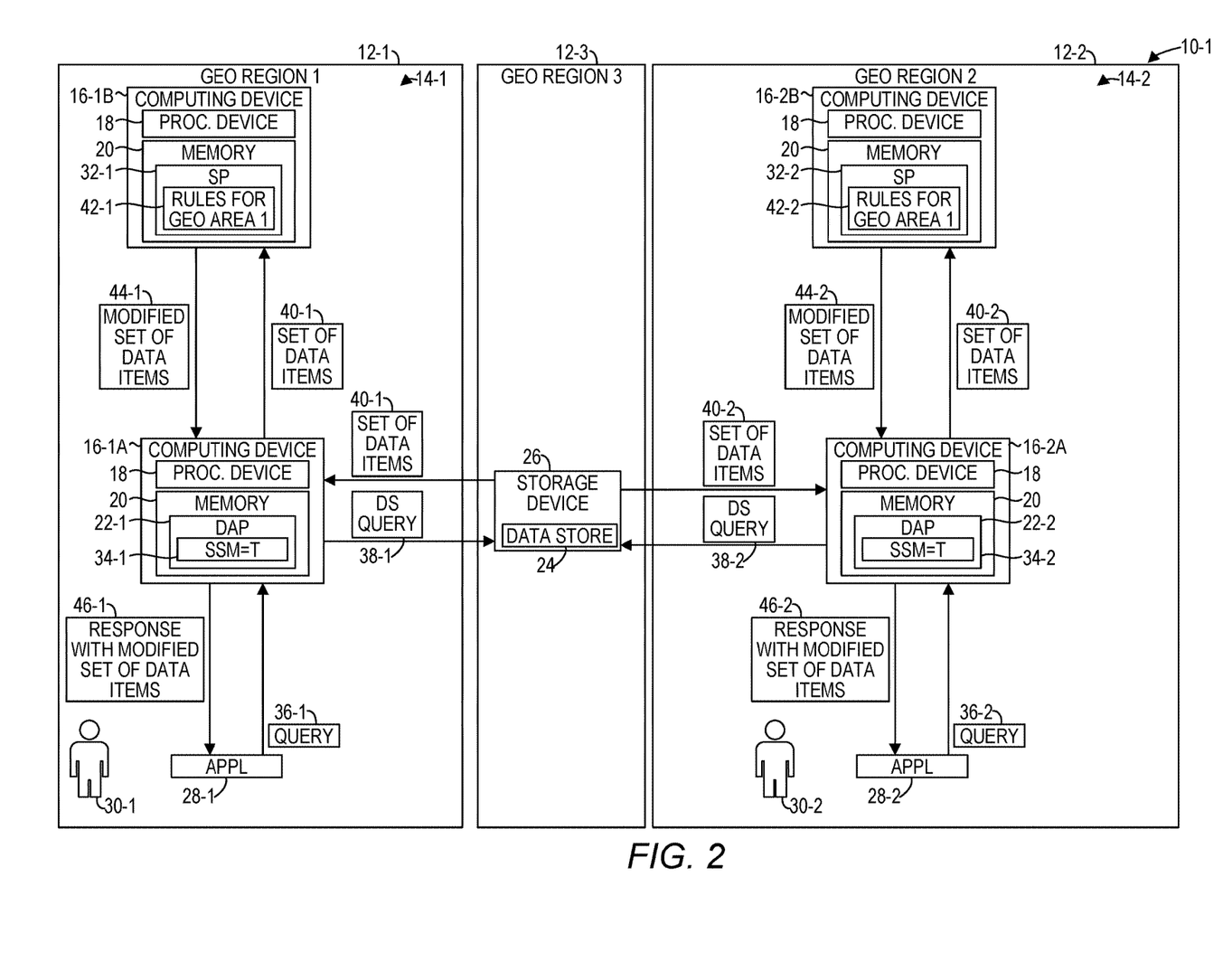
FIG. 2 is a block diagram of an environment in which sidecar data services for enforcing data policies can be practiced according to another example.

FIG. 2 is a block diagram of an environment 10-1 in which sidecar data services for enforcing data policies can be practiced according to another example. The environment 10-1 is substantially similar to the environment 10 except as otherwise discussed herein. In this example, a data store 24 stored on a storage device 26 is located in a geographic region 12-3. The DAP 22-1 accesses the data store 24 and the DAP 22-2 also accesses the data store 24. Even though the same data store 24 is being accessed and the data store 24 exists in a different geographic region 12-3, the example provided above with regard to FIG. 1 would operate identically because the rules 42-1 and the rules 42-2 enforce the data policies of the geographic regions 12-1 and 12-2 respectively.

Figure 3:
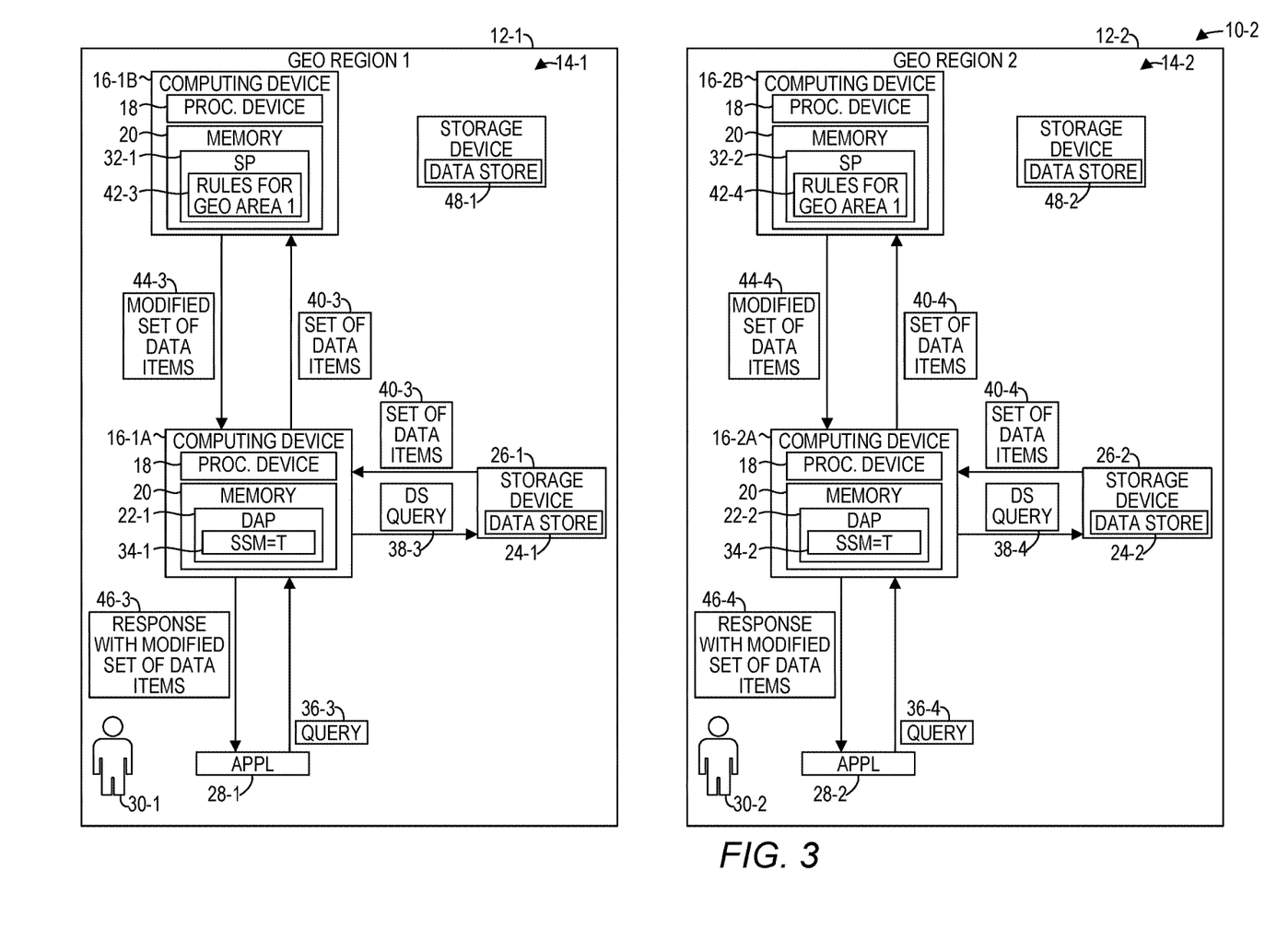
FIG. 3 is a block diagram of an environment in which sidecar data services for enforcing data policies can be practiced according to another example.

FIG. 3 is a block diagram of an environment 10-2 in which sidecar data services for enforcing data policies can be practiced according to another example. The environment 10-2 is substantially similar to the environment 10-1 except as otherwise discussed herein. In this example, certain sensitive data is stored in a data store 48-1. The sidecar process 32-1 has access to the data store 48-1 but the DAP 22-1 does not. In this example the user 30-1 issues a query 36-3 requesting pricing information regarding various products sold by a software manufacturer. In this example the user 30-1 is an employee of a customer of a software manufacturer that owns and operates the systems 14-1 and 14-2, and the application 28-1 may comprise, for example, a web browser executing on a computing device operated by the customer.

The DAP 22-1 receives the query 36-3, and determines that the DAP 22-1 is in the sidecar supplementation mode based on the sidecar supplementation mode flag 34-1, and provides the query 36-3 to the sidecar process 32-1. In this example, the sidecar process 32-1 does not modify the query 36-3. The DAP 22-1 accesses the data store 24 to obtain the requested information from the data store 24. Specifically, the DAP 22-1 may send a data store query 38-3 that utilizes specific data store access commands, such as SQL commands or the like, that the data store 24 requires in order to obtain information from the data store 24.

The data store 24 responds to the data store query 38-3 with a set of data items 40-3. The set of data items 40-3 may include, for example, the names of products and retail costs for each such product. The set of data items 40-3 may also include data item metadata that identifies what the data items are. The DAP 22-1 determines that the DAP 22-1 is in the sidecar supplementation mode and provides the sidecar process 32-1 access to the set of data items 40-3.

The DAP 22-1 provides the sidecar process 32-1 access to the set of data items 40-3 and access to metadata associated with the query 36-3, such as an identifier of the user 30-1, privileges associated with the user 30-1, and the like. The sidecar process 32-1 accesses rules 42-3 which comprise a criterion or criteria identifying data policies that are to be enforced in the geographic region 12-1. The criterion indicate that the pricing for the software manufacturer's products are 20% lower than suggested retail in the geographic region 12-1. The criterion indicate also indicate that the user 30-1 has enhanced privileges and can be provided contact information of certain executive sales employees of the software manufacturer. In response to determining that the user 30-1 has enhanced privileges, the sidecar process 32-1 accesses the data store 48-1 and obtains from the data store 48-1 the names and contact information of the executive sales employees. The sidecar process 32-1 adds the names and contact information of the executive sales employees to the set of data items 40-3 to generate a modified set of data items 44-3. The sidecar process 32-1 then causes the modification of the cost information by applying an algorithm to the cost data items to generate new cost data items that are 20% lower than the original cost data items. Alternatively, the sidecar process 32-1 provides the 20% cost discount information to the DAP 22-1 which replaces the cost data items with costs that are 20% lower. The DAP 22-1 may then generate a response 46-3 that includes the modified set of data items 44-3, including the reduced costs and names of the sales employees, and sends the response 46-3 to the application 28-1 for presentation to the user 30-1.

In another example, the data store 48-1 may have special pricing for certain entities. The rules 42-3 may identify the user 30-1 as a user that has special pricing. The sidecar process 32-1 may then access the data store 48-1 and obtain different costs than that returned by the data store 24. The sidecar process 32-1 may generate the modified set of data items 44-3 by replacing the cost information from the data store 24 with the cost information from the data store 48-1.

In the geographic region 12-2, the SP 32-2 similarly has access to a data store 48-2 but the DAP 22-2 does not. In this example the user 30-2 issues a query 36-4 that is essentially the same as the query 36-3 requesting pricing information regarding various products sold by the software manufacturer. In this example the user 30-2 is an employee of a different customer of the software manufacturer located in a different geographic region.

The DAP 22-1 receives the query 36-4, and determines that the DAP 22-2 is in the sidecar supplementation mode based on the sidecar supplementation mode flag 34-2, and provides the query 36-4 to the sidecar process 32-2. In this example, the sidecar process 32-2 does not modify the query 36-2. The DAP 22-1 sends a data store query 38-4 that utilizes specific data store access commands, such as SQL commands or the like, that the data store 24 requires in order to obtain information from the data store 24.

The data store 24 responds to the data store query 38-4 with a set of data items 40-4. The set of data items 40-4 may include, for example, the names of products and retail costs for each such product. The set of data items 40-4 may also include data item metadata that identifies what the data items are. The DAP 22-2 determines that the DAP 22-2 is in the sidecar supplementation mode and provides the sidecar process 32-2 access to the set of data items 40-4.

The DAP 22-2 provides the sidecar process 32-2 access to the set of data items 40-4 and access to metadata associated with the query 36-4, such as an identifier of the user 30-2, privileges associated with the user 30-2, and the like. The sidecar process 32-2 accesses rules 42-4 which comprise a criterion or criteria identifying data policies that are to be enforced in the geographic region 12-2. The criterion indicate that the pricing for the software manufacturer's products are 30% lower than suggested retail in the geographic region 12-2. The criterion indicate also indicate that the user 30-2 does not have enhanced privileges and cannot be provided contact information of certain executive sales employees of the software manufacturer. In response to determining that the user 30-2 does not have enhanced privileges, causes the modification of the cost information by replacing the cost data items with costs that are 30% lower. Alternatively, the sidecar process 32-2 provides the 30% cost discount information to the DAP 22-2 which replaces the cost data items with costs that are 30% lower. The DAP 22-2 may then generate a response 46-4 that includes the modified set of data items 44-4, including the reduced costs, and sends the response 46-4 to the application 28-2 for presentation to the user 30-2.

Figure 4:
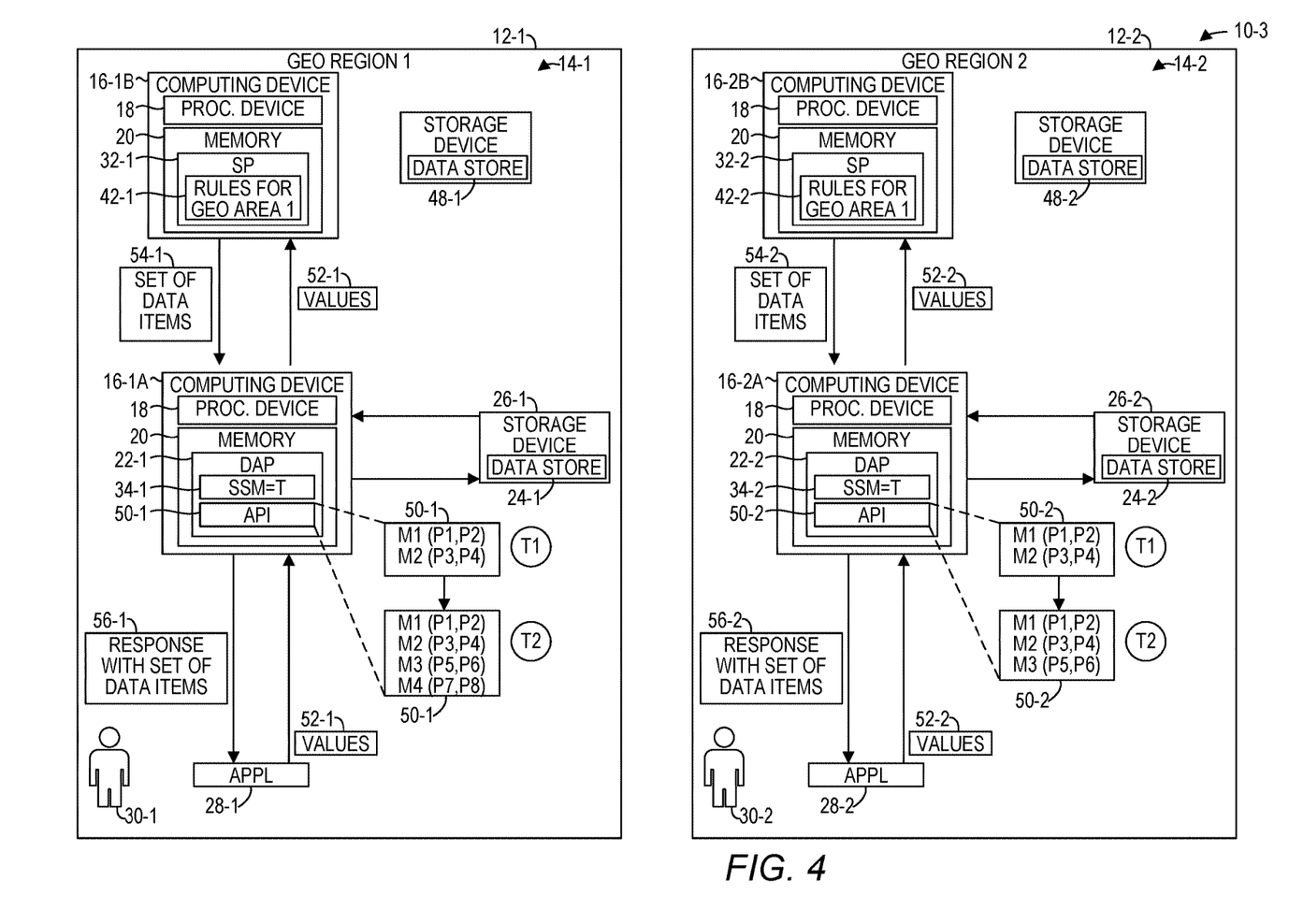
FIG. 4 is a block diagram of an environment in which sidecar data services for enforcing data policies can be practiced according to another example.

FIG. 4 is a block diagram of an environment 10-3 in which sidecar data services for enforcing data policies can be practiced according to another example. The environment 10-3 is substantially similar to the environment 10-2 except as otherwise discussed herein. In this example, by default, the DAP 22-1 offers an application programming interface (API) 50-1 to applications, such as the application 28-1. At a time T1, such as when the DAP 22-1 first initializes, the DAP 22-1 offers two API entry points (e.g., M1 and M2) that the application 28-1 can invoke to obtain information from the data store 24-1 via the DAP 22-1. Upon initialization, the sidecar process 32-1 accesses the rules 42-1 and, based on the rules, determines that certain information in the data store 48-1 can be made available to applications, such as the application 28-1, that execute in the geographic region 12-1. The sidecar process 32-1 sends the DAP 22-1 application programming interface (API) information that identifies two API entry points and parameters that correspond to the API entry points. The DAP 22-1 receives the API information from the sidecar process 32-1 and at a time T2 sends to the application 28-1 a message that the DAP 22-1 now offers four API entry points (e.g., M1, M2, M3, and M4).

The application 28-1 invokes the M3 entry point providing values 52-1 for the parameters P5 and P6. The DAP 22-1 provides the values 52-1 of the parameters to the sidecar process 32-1. The sidecar process 32-1 accesses the data store 48-1 and extracts a set of data items 54-1 from the data store 48-1 based on the values 52-1 of the parameters. The sidecar process 32-1 provides the set of data items 54-1 to the DAP 22-1. The DAP 22-1 generates a response 56-1 that includes the set of data items 54-1 and provides the response 56-1 to the application 28-1.

Similarly, in the geographic region 12-2, by default, the DAP 22-2 offers an application programming interface (API) 50-2 to applications, such as the application 28-2. At a time T1, such as when the DAP 22-2 first initializes, the DAP 22-2 offers two API entry points (e.g., M1 and M2) that the application 28-2 can invoke to obtain information from the data store 24-2 via the DAP 22-2. Upon initialization, the sidecar process 32-2 accesses the rules 42-2 and, based on the rules, determines that certain information in the data store 48-2 can be made available to applications, such as the application 28-2, that execute in the geographic region 12-2. However, based on the rules 42-2, certain information that is available in the geographic region 12-2 is not available in the geographic region 12-1. The sidecar process 32-2 sends the DAP 22-2 application programming interface (API) information that identifies one API entry point and parameters that correspond to the API entry point. The DAP 22-2 receives the API information from the sidecar process 32-2 and at a time T2 sends to the application 28-2 a message that the DAP 22-2 now offers three API entry points (e.g., M1, M2, and M3).

The application 28-2 invokes the M3 entry point providing values 52-2 for the parameters P5 and P6. The DAP 22-2 provides the values 52-2 of the parameters to the sidecar process 32-2. The sidecar process 32-2 accesses the data store 48-2 and extracts a set of data items 54-2 from the data store 48-2 based on the values 52-2 of the parameters. The sidecar process 32-2 provides the set of data items 54-2 to the DAP 22-2. The DAP 22-2 generates a response 56-2 that includes the set of data items 54-2 and provides the response 56-2 to the application 28-2.

Figure 5:
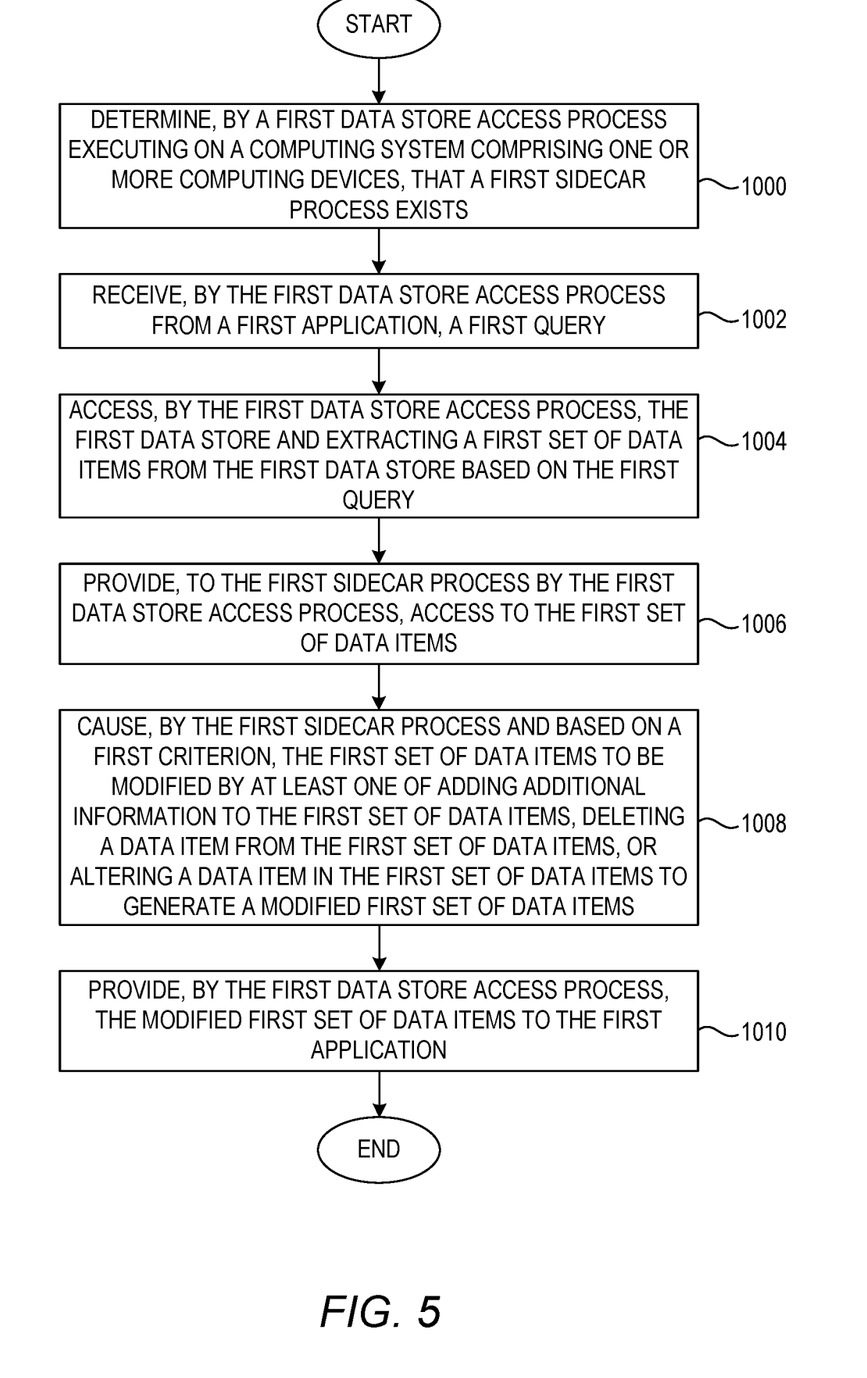
FIG. 5 is a flowchart of a method for implementing sidecar data services for enforcing data policies according to one implementation.

FIG. 5 is a flowchart of a method for implementing sidecar data services for enforcing data policies according to one implementation. FIG. 5 will be discussed in conjunction with FIG. 1. The data store access process 22-1, executing on the computing system 14-1 which includes the one or more computing devices 16, determines that the sidecar process 32-1 exists (FIG. 5, block 1000). The data store access process 22-1 receives, from the application 28-1, the query 36-1 (FIG. 5, block 1002). The data store access process 22-1 accesses the data store 24-1 and extracts the set of data items 40-1 from the data store 24-1 based on the query 36-1 (FIG. 5, block 1004). The data store access process 22-1 provides, to the sidecar process 32-1, access to the set of data items 40-1 (FIG. 5, block 1006). The sidecar process 2-1, based on the criterion in the rules 42-1, causes the set of data items 40-1 to be modified by at least one of adding additional information to the set of data items 40-1, deleting a data item from the set of data items 40-1, or altering a data item in the set of data items 40-1 to generate the modified set of data items 44-1 (FIG. 5, block 1008). The data store access process 22-1 provides the modified set of data items 44-1 to the application 28-1 (FIG. 5, block 1010).

Figure 6:
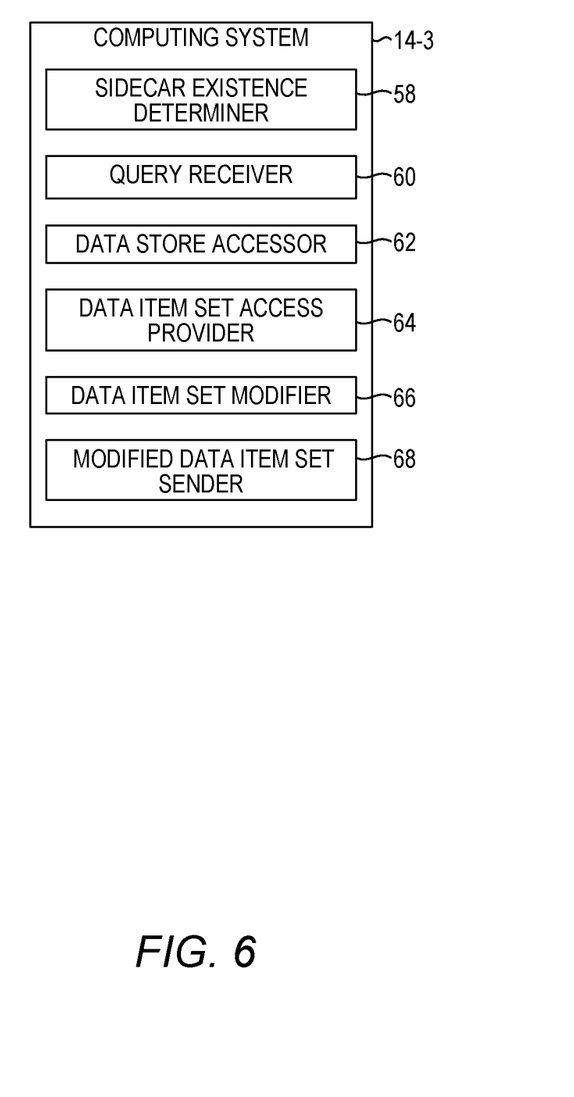
FIG. 6 is a block diagram of a computing system suitable for implementing aspects illustrated in FIGS. 1-4 according to one implementation.

FIG. 6 is a block diagram of a computing system 14-3 suitable for implementing aspects illustrated in FIGS. 1-4 according to one implementation. The computing system 14-3 implements identical functionality as that described above with regard to the computing system 14-1. The computing system 14-3 includes a sidecar existence determiner 58 operable to determine that a sidecar process exists. The sidecar existence determiner 58 may comprise executable software instructions configured to program a processor device to implement the functionality of determining that a sidecar process exists, may comprise circuitry including, by way of non-limiting example, an application-specific integrated circuit (ASIC), field-programmable gate array (FPGA), or may comprise a combination of executable software instructions and circuitry.

The computing system 14-3 includes a query receiver 60 operable to receive, from an application, a query. The query receiver 60 may comprise executable software instructions configured to program a processor device to implement the functionality of receiving, from an application, a query, may comprise circuitry including, by way of non-limiting example, an application-specific integrated circuit (ASIC), field-programmable gate array (FPGA), or may comprise a combination of executable software instructions and circuitry.

The computing system 14-3 includes a data store accessor 62 operable to access the data store and extract a set of data items from the data store based on the query. The data store accessor 62 may comprise executable software instructions configured to program a processor device to implement the functionality of accessing the data store and extracting a set of data items from the data store based on the query, may comprise circuitry including, by way of non-limiting example, an application-specific integrated circuit (ASIC), field-programmable gate array (FPGA), or may comprise a combination of executable software instructions and circuitry.

The computing system 14-3 includes a data item set provider 64 operable to provide, to the first sidecar process, access to the set of data items. The data item set provider 64 may comprise executable software instructions configured to program a processor device to implement the functionality of providing, to the first sidecar process, access to the set of data items, may comprise circuitry including, by way of non-limiting example, an application-specific integrated circuit (ASIC), field-programmable gate array (FPGA), or may comprise a combination of executable software instructions and circuitry.

The computing system 14-3 includes a data item set modifier 66 operable to cause, by the first sidecar process and based on a first criterion, the first set of data items to be modified by at least one of adding additional information to the first set of data items, deleting a data item from the first set of data items, or altering a data item in the first set of data items to generate a modified first set of data items. The data item set modifier 66 may comprise executable software instructions configured to cause, by the first sidecar process and based on a first criterion, the first set of data items to be modified by at least one of adding additional information to the first set of data items, deleting a data item from the first set of data items, or altering a data item in the first set of data items to generate a modified first set of data items, may comprise circuitry including, by way of non-limiting example, an application-specific integrated circuit (ASIC), field-programmable gate array (FPGA), or may comprise a combination of executable software instructions and circuitry.

The computing system 14-3 includes a modified data item set sender 68 operable to provide the modified first set of data items to the first application. The modified data item set sender 68 may comprise executable software instructions configured to program a processor device to implement the functionality of providing the modified first set of data items to the first application, may comprise circuitry including, by way of non-limiting example, an application-specific integrated circuit (ASIC), field-programmable gate array (FPGA), or may comprise a combination of executable software instructions and circuitry.

Figure 7:
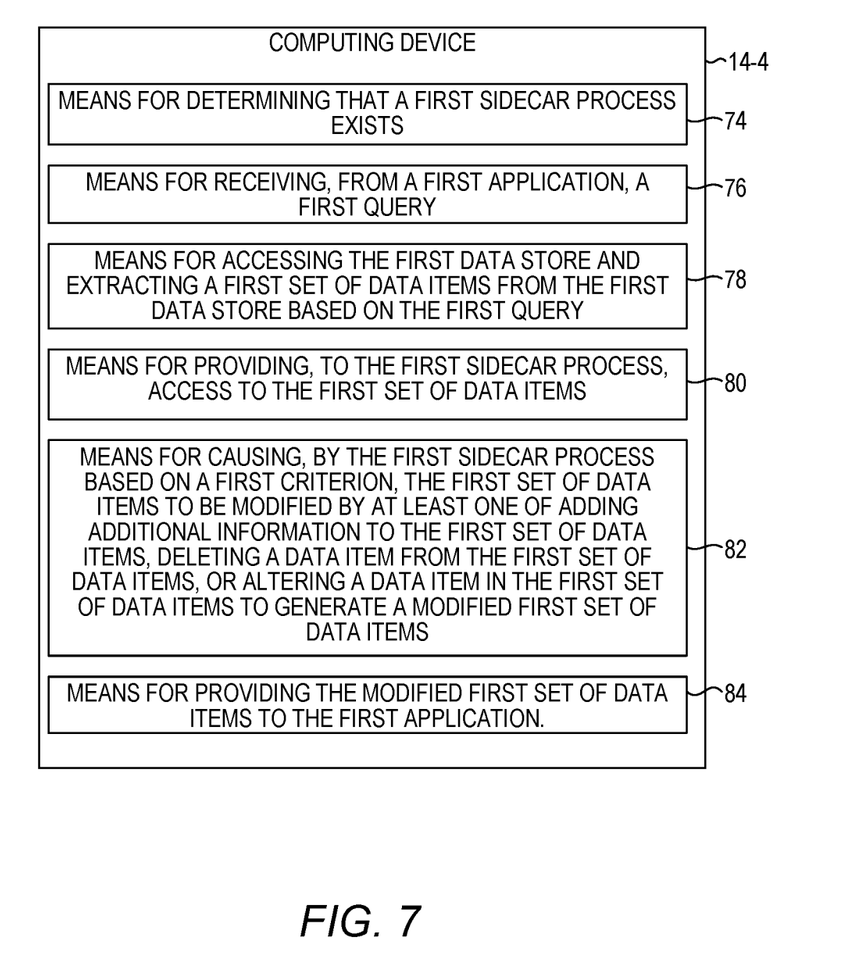
FIG. 7 is a block diagram of a computing system suitable for implementing aspects illustrated in FIGS. 1-4 according to another implementation.

FIG. 7 is a block diagram of a computing system 14-4 suitable for implementing aspects illustrated in FIGS. 1-4 according to another implementation. The computing system 14-4 implements identical functionality as that described above with regard to the computing system 14-1. The computing system 14-4 includes a means 74 for determining that a first sidecar process exists. The means 74 may be implemented in any number of manners, including, for example, via the sidecar existence determiner 58 illustrated in FIG. 6. The computing system 14-4 includes a means 76 for receiving, from a first application, a first query. The means 76 may be implemented in any number of manners, including, for example, via the query receiver 60 illustrated in FIG. 6. The computing system 14-4 includes a means 78 for accessing the first data store and extracting a first set of data items from the first data store based on the first query. The means 78 may be implemented in any number of manners, including, for example, via the data store accessor 62 illustrated in FIG. 6. The computing system 14-4 includes a means 80 for providing, to the first sidecar process, access to the first set of data items. The means 80 may be implemented in any number of manners, including, for example, via the data item set access provider 64 illustrated in FIG. 6. The computing system 14-4 includes a means 82 for causing, by the first sidecar process and based on a first criterion, the first set of data items to be modified by at least one of adding additional information to the first set of data items, deleting a data item from the first set of data items, or altering a data item in the first set of data items to generate a modified first set of data items. The means 82 may be implemented in any number of manners, including, for example, via the data item set modifier 66 illustrated in FIG. 6. The computing system 14-4 includes a means 84 for providing the modified first set of data items to the first application. The means 84 may be implemented in any number of manners, including, for example, via the modified data item set sender 68 illustrated in FIG. 6.

Figure 8:
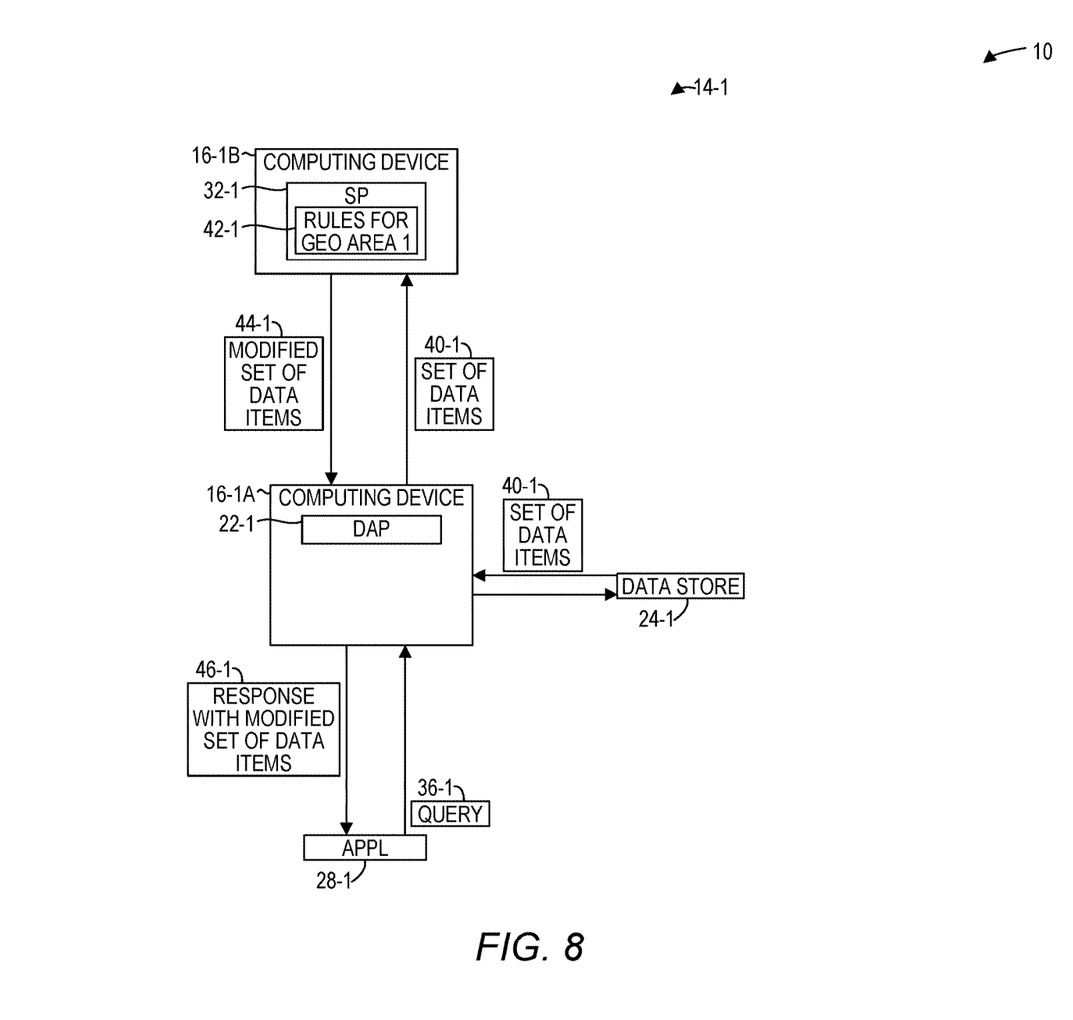
FIG. 8 is a simplified block diagram of the environment illustrated in FIG. 1 according to one implementation.

FIG. 8 is a simplified block diagram of the environment 10 illustrated in FIG. 1 according to one implementation. The environment 10 includes the computing system 14-1 which includes the one or more computing devices 16-1A and 16-1B that are to determine that the sidecar process 32-1 exists. The one or more computing devices 16-1A and 16-1B are further to receive, from the application 28-1, the query 36-1. The one or more computing devices 16-1A and 16-1B are further to access the data store 24-1 and extract the set of data items 40-1 from the data store 24-1 based on the query 36-1. The one or more computing devices 16-1A and 16-1B are further to provide, to the sidecar process 32-1, access to the set of data items 40-1. The one or more computing devices 16-1A and 16-1B are further to cause, by the sidecar process 32-1 and based on the criterion, such as the rules 42-1, the set of data items 40-1 to be modified by at least one of adding additional information to the set of data items 40-1, deleting a data item from the set of data items 40-1, or altering a data item in the set of data items 40-1 to generate the modified set of data items 44-1. The one or more computing devices 16-1A and 16-1B are further to provide the modified set of data items 40-1 to the application 28-1.

Figure 9:
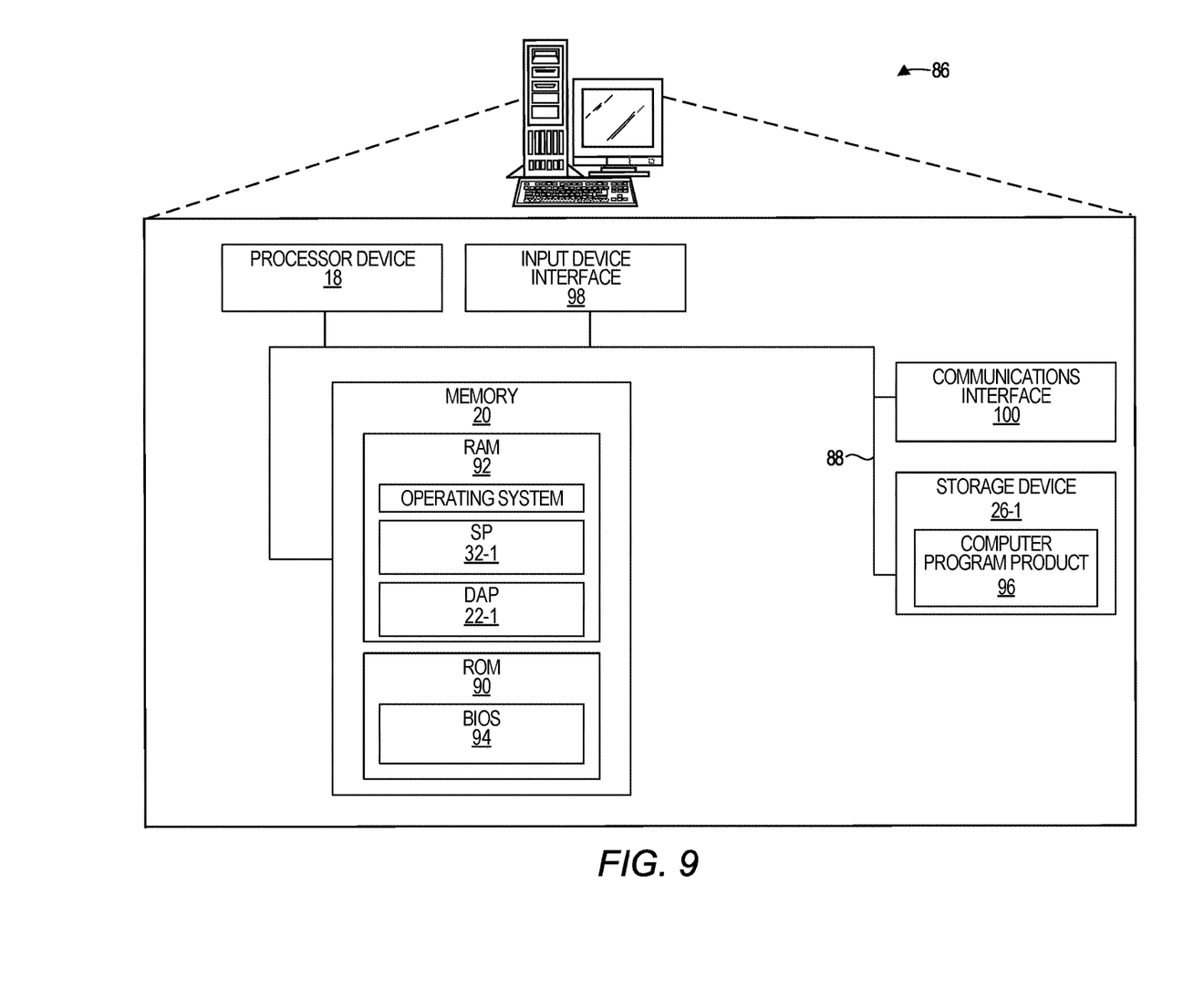
FIG. 9 is a block diagram of a computing device suitable for implementing any of the computing devices disclosed herein.

FIG. 9 is a block diagram of a computing device 86 suitable for implementing any of the computing devices disclosed herein. The computing device 86 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 86 includes the processor device 18, the memory 20, and a system bus 88. The system bus 88 provides an interface for system components including, but not limited to, the memory 20 and the processor device 18. The processor device 18 can be any commercially available or proprietary processor.

The system bus 88 may be any of several types of bus structures that may further interconnect to a memory bus (with or without a memory controller), a peripheral bus, and/or a local bus using any of a variety of commercially available bus architectures. The memory 20 may include non-volatile memory 90 (e.g., read-only memory (ROM), erasable programmable read-only memory (EPROM), electrically erasable programmable read-only memory (EEPROM), etc.), and volatile memory 92 (e.g., random-access memory (RAM)). A basic input/output system (BIOS) 94 may be stored in the non-volatile memory 90 and can include the basic routines that help to transfer information between elements within the computing device 86. The volatile memory 92 may also include a high-speed RAM, such as static RAM, for caching data.

The computing device 86 may further include or be coupled to a non-transitory computer-readable storage medium such as a storage device 26-1, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 26-1 and other drives associated with computer-readable media and computer-usable media may provide non-volatile storage of data, data structures, computer-executable instructions, and the like.

A number of modules can be stored in the storage device 26-1 and in the volatile memory 92, including an operating system and one or more program modules, such as the DAP 22-1 and the sidecar process 32-1, which may implement the functionality described herein in whole or in part. All or a portion of the examples may be implemented as a computer program product 96 stored on a transitory or non-transitory computer-usable or computer-readable storage medium, such as the storage device 26-1, which includes complex programming instructions, such as complex computer-readable program code, to cause the processor device 18 to carry out the steps described herein. Thus, the computer-readable program code can comprise software instructions for implementing the functionality of the examples described herein when executed on the processor device 18. The processor device 18, in conjunction with the DAP 22-1 and the sidecar process 32-1 in the volatile memory 92, may serve as a controller, or control system, for the computing device 86 that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the processor device 18 through an input device interface 98 that is coupled to the system bus 88 but can be connected by other interfaces such as a parallel port, an Institute of Electrical and Electronic Engineers (IEEE) 1394 serial port, a Universal Serial Bus (USB) port, an IR interface, and the like. The computing device 86 may also include a communications interface 100 suitable for communicating with a network as appropriate or desired.

Other computing system designs and configurations may also be suitable to implement the systems and methods described herein. The following examples illustrate various additional implementations in accordance with one or more aspects of the disclosure.

Example 1 is a computing system that includes a sidecar existence determiner operable to determine that a first sidecar process exists; a query receiver operable to receive, from an application, a query; a data store accessor operable to access the data store and extract a set of data items from the data store based on the query; a data item set provider operable to provide, to the first sidecar process, access to the set of data items; a data item set modifier 66 operable to cause, by the first sidecar process and based on a first criterion, the first set of data items to be modified by at least one of adding additional information to the first set of data items, deleting a data item from the first set of data items, or altering a data item in the first set of data items to generate a modified first set of data items; and a modified data item set sender operable to provide, by the first data store access process, the modified first set of data items to the first application.

Example 2 is a computing system that includes a means for determining that a first sidecar process exists; a means for receiving, from a first application, a first query; a means for accessing the first data store and extracting a first set of data items from the first data store based on the first query; a means for providing, to the first sidecar process, access to the first set of data items; a means for causing, by the first sidecar process and based on a first criterion, the first set of data items to be modified by at least one of adding additional information to the first set of data items, deleting a data item from the first set of data items, or altering a data item in the first set of data items to generate a modified first set of data items; and a means for providing the modified first set of data items to the first application.

Example 3 is a method comprising determining, by a data store access process executing on a computing system comprising one or more computing devices, that a sidecar process exists, wherein the data store access process is operable to, in response to a query from an application, access a data store and extract a set of data items from the data store based on the query, and wherein the sidecar process is operable to modify the set of data items based on a criterion; receiving, by a data store access process from the sidecar process, application programming interface (API) information that identifies at least one API entry point and one or more parameters that correspond to the API entry point; sending, by the data store access process to the application, information indicating that the data store access process has the at least one API entry point previously not offered by the data store access process to the application; receiving, by the data store access process from the application, an invocation of the at least one API entry point, the invocation including values for each of the one or more parameters; providing, to the sidecar process, the values for each of the one or more parameters; extracting, by the sidecar process from a second data store that is different from the data store, at least one data item based on the values; providing, by the sidecar process to the data store access process, the at least one data item; and providing, by the data store access process to the application, the at least one data item.

Example 4 is the method of example 3 further comprising accessing, by the data store access process, the data store and extracting a set of data items from the data store based on information contained in the invocation of the at least one API entry point; and wherein providing, by the data store access process to the application, the at least one data item comprises providing, by the data store access process to the application, the at least one data item and the set of data items.

Example 5 is the method of example 3 further comprising accessing, by the data store access process, the data store and extracting a set of data items from the data store based on the invocation of the at least one API entry point; providing, to the sidecar process by the data store access process, access to the set of data items; modifying, by the sidecar process and based on the criterion, the set of data items by at least one of adding additional information to the set of data items, deleting a data item in the set of data items, or altering a data item in the set of data items to generate a modified set of data items; and wherein providing, by the data store access process to the application, the at least one data item comprises providing, by the data store access process to the application, the at least one data item and the set of modified data items.

Example 6 is the method of example 3 wherein receiving, by the data store access process from the sidecar process, the API information that identifies the at least one API entry point and the one or more parameters comprises receiving, by the data store access process from the sidecar process, API information that identifies a plurality of API entry points and for each respective API entry point of the plurality of API entry points, one or more parameters that correspond to the respective API entry point; and sending, by the data store access process to the application, information indicating that the data store access process has the plurality of API entry points previously not offered by the data store access process to the application.

Example 7 is the method of example 3 further comprising determining, by the sidecar process, an entity associated with the invocation of the at least one entry point; accessing information that correlates a plurality of entities with permissions; and, based on a permission that corresponds to the entity, providing the at least one data item to the data store access process.

Example 8 is a computing device, comprising a memory and a processor device coupled to the memory to determine, by a data store access process executing on a computing system comprising one or more computing devices, that a sidecar process exists, wherein the data store access process is operable to, in response to a query from an application, access a data store and extract a set of data items from the data store based on the query, and wherein the sidecar process is operable to modify the set of data items based on a criterion; receive, by a data store access process from the sidecar process, application programming interface (API) information that identifies at least one API entry point and one or more parameters that correspond to the API entry point; send, by the data store access process to the application, information indicating that the data store access process has the at least one API entry point previously not offered by the data store access process to the application; receive, by the data store access process from the application, an invocation of the at least one API entry point, the invocation including values for each of the one or more parameters; provide, to the sidecar process, the values for each of the one or more parameters; extract, by the sidecar process from a second data store that is different from the data store, at least one data item based on the values; provide, by the sidecar process to the data store access process, the at least one data item; and provide, by the data store access process to the application, the at least one data item.

Example 9 is the computing device of example 8 wherein the one or more computing devices are further to access, by the data store access process, the data store and extract a set of data items from the data store based on information contained in the invocation of the at least one API entry point; and wherein to provide, by the data store access process to the application, the at least one data item, the one or more computing devices are further to provide, by the data store access process to the application, the at least one data item and the set of data items.

Example 10 is a method comprising determining, by a data store access process executing on a computing system comprising one or more computing devices, that a sidecar process exists, wherein the data store access process is operable to, in response to a query from an application, access a data store and extract a set of data items from the data store based on the query; receiving, by the data store access process from a first application, a first query; accessing, by the data store access process, the data store and extracting a first set of data items from the data store based on the first query; providing, by the data store access process, the sidecar process access to the first set of data items; accessing, by the sidecar process, data that identifies data items prohibited from being provided to an application; determining, by the sidecar process, that the first set of data items contains at least one data item that is prohibited from being provided to the first application; removing, from the first set of data items, the at least one data item; and providing, by the data store access process, the modified set of data items to the application.

Example 11 is the method of example 10 further comprising receiving, by the data store access process from a second application, a second query; accessing, by the first data store access process, the first data store and extracting a second set of data items from the first data store based on the second query; providing, to the first sidecar process access by the first data store access process, the second set of data items; accessing, by the first sidecar process, data that identifies data items prohibited from being provided to an application unless an entity associated with the application has a certain privilege status; determining, by the first sidecar process, that the second set of data items contains at least one data item that is prohibited from being provided to the second application; determining, by the first sidecar process, that the entity associated with the second application has the certain privilege status; and allowing, by the first sidecar process, the at least one data item to remain in the second set of data.

Example 12 is a computing device, comprising a memory and a processor device coupled to the memory to determine, by a data store access process executing on a computing system comprising one or more computing devices, that a sidecar process exists, wherein the data store access process is operable to, in response to a query from an application, access a data store and extract a set of data items from the data store based on the query; receive, by the data store access process from a first application, a first query; access, by the data store access process, the data store and extracting a first set of data items from the data store based on the first query; provide, by the data store access process, the sidecar process access to the first set of data items; access, by the sidecar process, data that identifies data items prohibited from being provided to an application; determine, by the sidecar process, that the first set of data items contains at least one data item that is prohibited from being provided to the first application; remove, from the first set of data items, the at least one data item; and provide, by the data store access process, the modified set of data items to the application.

Example 13 is a method comprising determining, by a data store access process executing on a computing system comprising one or more computing devices, that a sidecar process exists, wherein the data store access process is operable to, in response to a store request from an application, store data identified in the store request in a data store, and wherein the sidecar process is operable to analyze the store request prior to storing the data; receiving, by the data store access process from the application, a store request, the store request including information to be stored in the data store; providing, by the data store access process to the sidecar process, access to information contained in the store request; determining, by the sidecar process, an attribute of the store request; based on the attribute, determining that at least some of the information in the store request is not to be stored in the data store; and informing, the data store access process that the information is not to be stored in the data store.

Example 14 is the method of example 13 wherein determining, by the sidecar process, the attribute of the store request comprises determining a geographic area in which the store request originated; and wherein based on the attribute, determining that the at least some of the information in the store request is not to be stored in the data store comprises determining that a data item contained in the information is prohibited from being stored based on the geographic area.

Example 15 is a computing device, comprising a memory and a processor device coupled to the memory to determine, by a data store access process executing on a computing system comprising one or more computing devices, that a sidecar process exists, wherein the data store access process is operable to, in response to a store request from an application, store data identified in the store request in a data store, and wherein the sidecar process is operable to analyze the store request prior to storing the data; receive, by the data store access process from the application, a store request, the store request including information to be stored in the data store; provide, by the data store access process to the sidecar process, access to information contained in the store request; determine, by the sidecar process, an attribute of the store request; based on the attribute, determine that at least some of the information in the store request is not to be stored in the data store; and inform, the data store access process that the information is not to be stored in the data store.

Individuals will recognize improvements and modifications to the preferred examples of the disclosure. All such improvements and modifications are considered within the scope of the concepts disclosed herein and the claims that follow.

What is claimed is:

1. A method comprising:
   determining, by a first data store access process executing on a computing system comprising one or more computing devices, that a first sidecar process exists;
   receiving, by the first data store access process from a first application, a first query;
   accessing, by the first data store access process, the first data store and extracting a first set of data items from the first data store based on the first query;
   providing, to the first sidecar process by the first data store access process, access to the first set of data items;
   causing, by the first sidecar process and based on a first criterion, the first set of data items to be modified by at least one of adding additional information to the first set of data items, deleting a data item from the first set of data items, or altering a data item in the first set of data items to generate a modified first set of data items; and
   providing, by the first data store access process, the modified first set of data items to the first application.

2. The method of claim 1, wherein determining that the first sidecar process exists comprises receiving, during initiation, information that indicates that the first sidecar process exists.

3. The method of claim 1, wherein determining that the first sidecar process exists comprises accessing an application programming interface (API) and determining, based on a response to accessing the API, that the first sidecar process exists.

4. The method of claim 1, further comprising:
   in response to determining that the first sidecar process exists, entering a sidecar supplementation mode.

5. The method of claim 4, wherein providing, to the first sidecar process by the first data store access process, access to the first set of data items comprises:
   determining, by the first data store access process, that the first data store access process is in the sidecar supplementation mode; and
   in response to determining that the first data store access process is in the sidecar supplementation mode, providing, to the first sidecar process by the first data store access process, access to the first set of data items.

6. The method of claim 1, further comprising:
   determining, by the first sidecar process, that the first query originated in a first geographic area;
   determining, by the first sidecar process, that the first criterion indicates that a subset of data items of the first set of data items is prohibited to be returned to the first application; and
   removing, from the first set of data items, the subset of data items to generate the modified first set of data items.

7. The method of claim 6, further comprising:
   determining, by the first sidecar process, that the first application is executing on a computing device that is located in the first geographic area; and
   wherein the first criterion indicates that that the subset of data items is prohibited to be returned to any application executing on a device located in the first geographic area.

8. The method of claim 1, further comprising:
   determining, by the first sidecar process, that the first query originated from a particular entity;

determining, by the first sidecar process, that the first criterion indicates that at least one data item of the first set of data items is to be modified in accordance with a predetermined algorithm if the first query originated from the particular entity; and applying, by the first sidecar process or the first data store access process, the predetermined algorithm to the at least one data item to alter the at least one data item to generate the modified first set of data items.

9. The method of claim 8, wherein the at least one data item is a numeric data item and the predetermined algorithm modifies a value of the numeric data item.

10. The method of claim 1, further comprising:
determining, by a second data store access process executing on the computing system, that a second sidecar process exists, the second data store access process executing concurrently in time with the first data store access process;

receiving, by the second data store access process from a second application, a second query;

accessing, by the second data store access process, a second data store and extracting a second set of data items from the second data store based on the second query, the second data store having substantially identical information as the first data store;

providing, to the second sidecar process by the second data store access process, access to the second set of data items;

causing, by the second sidecar process and based on a second criterion, the second set of data items to be modified by at least one of adding additional information to the second set of data items, deleting a data item from the second set of data items, or altering a data item in the second set of data items to generate a modified second set of data items; and providing, by the second data store access process, the modified second set of data items to the second application.

11. The method of claim 10, wherein the second data store and the first data store are a same data store.

12. The method of claim 10, wherein the second data store is a copy of the first data store.

13. The method of claim 10, wherein the first criterion is associated with a first geographic area and the second criterion is associated with a second geographic area that is different from the first geographic area, and wherein the first criterion identifies a first subset of data items that, if present in a set of data items extracted from the first data store by the first data store access process, are to be modified in conjunction with a first algorithm to generate the modified first set of data items, and wherein the second criterion identifies the first subset of data items that, if present in a set of data items extracted from the second data store by the second data store access process, are to be modified in conjunction with a second algorithm to generate the modified second set of data items.

14. The method of claim 10, wherein the first data store access process comprises a first container, the first sidecar process comprises a second container, the first container and the second container execute in a first pod, the second data store access process comprises a third container, the second sidecar process comprises a fourth container, and the third container and the fourth container execute in a second pod.

15. The method of claim 10, wherein the first sidecar process and the second sidecar process are initiated from a same container image.

16. The method of claim 1, wherein the first data store access process comprises a first container.

17. The method of claim 1, wherein the first data store access process comprises a first container and the first sidecar process comprises a second container, and wherein the first container and the second container execute in a same pod.

18. A computing system comprising:
one or more computing devices to:
determine that a sidecar process exists;
receive, from an application, a query;
access a data store and extract a set of data items from the data store based on the query;
provide, to the sidecar process, access to the set of data items;
cause, by the sidecar process and based on a criterion, the set of data items to be modified by at least one of adding additional information to the set of data items, deleting a data item from the set of data items, or altering a data item in the set of data items to generate a modified set of data items; and
provide the modified set of data items to the application.

19. The computing system of claim 18, wherein the one or more computing devices are further to:
determine, by the sidecar process, that the query originated in a geographic area;
determine, by the sidecar process, that the criterion indicates that a subset of data items of the set of data items is prohibited to be returned to the application; and
remove, from the set of data items, the subset of data items to generate the modified set of data items.

20. A non-transitory computer-readable storage medium that includes executable instructions to cause one or more processor devices to:
receive, from an application, a query;
access a data store and extract a set of data items from the data store based on the query;
provide, to a sidecar process, access to the set of data items;
cause, by the sidecar process and based on a criterion, the set of data items to be modified by at least one of adding additional information to the set of data items, deleting a data item from the set of data items, or altering a data item in the set of data items to generate a modified set of data items; and
provide the modified set of data items to the application.

* * * * *